US009193327B2

(12) United States Patent
Clark

(10) Patent No.: US 9,193,327 B2
(45) Date of Patent: Nov. 24, 2015

(54) SYSTEM AND METHOD FOR INFLATION GAS FILTRATION THROUGH A TORTUOUS FLOW PATHWAY

(71) Applicant: Autoliv ASP, Inc, Ogden, UT (US)

(72) Inventor: Marcus T. Clark, Kaysville, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 14/153,496

(22) Filed: Jan. 13, 2014

(65) Prior Publication Data

US 2015/0197213 A1 Jul. 16, 2015

(51) Int. Cl.
*B60R 21/26* (2011.01)
*B01D 39/10* (2006.01)
*B01D 46/24* (2006.01)

(52) U.S. Cl.
CPC ................ *B60R 21/26* (2013.01); *B01D 39/10* (2013.01); *B01D 46/2403* (2013.01); *B60R 2021/26011* (2013.01)

(58) Field of Classification Search
CPC .... B01D 39/10; B01D 46/24; B01D 46/2403; B01D 46/12; B01D 46/106; B60R 21/26; B60R 2021/26011
USPC .................................. 280/741; 102/530, 531
See application file for complete search history.

(56) References Cited

U.S. PATENT DOCUMENTS 4,084,839 A 4/1978 Takagi et al.
5,100,171 A * 3/1992 Faigle et al. .................. 280/736
5,184,846 A 2/1993 Goetz
5,230,726 A 7/1993 Smith et al.
5,335,940 A 8/1994 Cuevas
5,562,304 A * 10/1996 Gest .............................. 280/740
5,645,296 A * 7/1997 Okada et al. .................. 280/736
5,660,606 A 8/1997 Adamini
7,568,728 B2 * 8/2009 Smith et al. .................. 280/736
7,905,516 B2 3/2011 Bostick et al.
8,333,154 B2 12/2012 Fukuyama et al.
8,702,125 B1 * 4/2014 Smith et al. .................. 280/740
2006/0043716 A1 * 3/2006 Quioc et al. .................. 280/741
2008/0150260 A1 * 6/2008 Whang et al. .............. 280/728.1
2009/0184504 A1 7/2009 Greenwood et al.
2012/0326423 A1 * 12/2012 Hoffman ....................... 280/741
2013/0291756 A1 * 11/2013 Ohsugi et al. ................ 102/530

FOREIGN PATENT DOCUMENTS

JP 2012240552 12/2012
WO WO 96/30105 10/1996
WO WO 00/06427 A1 * 2/2000

* cited by examiner

*Primary Examiner* — Ruth Ilan
(74) *Attorney, Agent, or Firm* — Madson IP, P.C.

(57) ABSTRACT

An airbag assembly may include an airbag and an inflator that provides inflation gas to inflate the airbag. A filter module may be positioned such that inflation gas exiting the inflator must first pass through the filter module. The filter module may be formed of a sheet of metal that is wrapped into a generally tubular shape. The filter module may have a first layer and a second layer that generally encircles the first layer. The first layer may have a pattern of holes and dimples that are separate from and/or displaced from each other. The dimples may protrude toward the second layer to maintain spacing to enable relatively unrestricted gas flow from the holes of the first layer through unaligned holes of the second layer. The resulting tortuous gas flow path may help to slow, cool, and/or purify the gas before it exits the inflator.

19 Claims, 4 Drawing Sheets

120 150 160 162 180 190 200 154 232 234 156 230 174 176 172 170 192 212 214 240 220 210 185 188 184 224 222 104 102 106

SYSTEM AND METHOD FOR INFLATION GAS FILTRATION THROUGH A TORTUOUS FLOW PATHWAY

TECHNICAL FIELD

The present invention relates to automotive safety. More specifically, the present invention relates to airbag inflators that enhance the cost-effectiveness of airbag systems.

BACKGROUND

Inflatable safety restraint devices, or airbags, are mandatory on most new vehicles. Airbags are typically installed as part of a system with an airbag module in the steering wheel on the driver's side of car and in the dashboard on the passenger side of a car. In the event of an accident, a sensor within the vehicle measures abnormal deceleration and triggers the ignition of a charge contained within an inflator. Expanding gases from the charge fill the airbags, which immediately inflate in front of the driver and passenger to protect them from harmful impact with the interior of the car. Typically, airbags are concealed within the vehicle trim to be invisible during normal vehicle operation. In addition to the driver's side and passenger's side airbags, many vehicles also have other airbags such as side airbags and/or inflatable curtains that inflate outboard of vehicle occupants to provide side impact, rollover, ejection, and/or small overlap collision protection, knee airbags, inflatable harnesses, and the like.

The inflator is a critical part of the airbag assembly because it supplies the inflation gas needed to inflate the airbag cushion. Typically, inflators are compressed gas, pyrotechnic, or hybrid inflators. "Compressed gas" inflators contain gas under pressure, while "pyrotechnic" inflators contain a pyrotechnic gas generant that ignites to produce the gas. "Hybrid" inflators typically use both compressed gas and a pyrotechnic charge. Some inflators are "dual stage," meaning that they can receive two independent activation signals to enable production of a selectively variable quantity of inflation gas, and others have only a single stage. However, single stage inflators can have multiple timed events, such as the ignition of multiple separate pyrotechnic charges and/or the release of distinct volumes of compressed gas, that are all triggered by a single activation signal.

Inflators of all types are typically made from a wide variety of parts. Each inflator may contain a selection of chambers, diffusers, filters, frangible membranes, initiators, generants, baffles, and containers, attachment hardware, and other components. Each of these parts adds significantly to the cost of the inflator. Hence, the inflator typically makes up a large portion of the cost of an airbag assembly.

Additionally, a series of different manufacturing steps may be needed to manufacture each inflator. The quantity of steps involved not only further increases the cost of potential inflators, it also increases the likelihood of defects in material or workmanship in the finished inflator.

SUMMARY OF THE INVENTION

The various systems and methods of the present invention have been developed in response to the present state of the art, and in particular, in response to the problems and needs in the art that have not yet been fully solved by currently available airbag systems and methods. Thus, it is advantageous to provide airbag systems and methods that provide reliable protection for vehicle occupants in a wide variety of collision situations. Further, it is advantageous to minimize manufacturing and installation costs. The present invention may have other benefits that are not specifically set forth herein.

To achieve the foregoing, and in accordance with the invention as embodied and broadly described herein, an inflator may be part of an airbag assembly for protecting a vehicle occupant from injury. The inflator may include an exterior wall with a first aperture and a gas source contained within a chamber defined within the exterior wall. In response to receipt by the inflator of a first activation signal, the gas source may provide a gas. The inflator may further include a filter module with a first layer and a second layer. The first layer may have a first plurality of holes. The first layer may be positioned such that the gas passes through the first plurality of holes to reach the second layer. The second layer may have a second plurality of holes, each of which is not aligned with each hole of the first plurality of holes. The second layer may be positioned such that the gas passes through the second plurality of holes to reach the first aperture. One of the first layer and the second layer may have a first plurality of dimples that protrudes toward the other of the first layer and the second layer to maintain a gap between the first layer and the second layer. Each dimple of the plurality of dimples may be separate from each hole of the corresponding plurality of holes.

The dimples of the first plurality of dimples may be arranged such that each dimple of the first plurality of dimples is substantially between and substantially equidistant from two adjacent holes of the corresponding plurality of holes. The first layer may have the first plurality of dimples, and the first plurality of dimples may protrude toward the second layer. The second layer may further include a second plurality of dimples that protrude toward the exterior wall to maintain spacing between the second layer and either the exterior wall, or a third layer of the filter module. Each dimple of the first plurality of dimples may be offset from each adjacent hole of the first plurality of holes by an offset of at least 0.5 mm.

The first layer and the second layer may cooperate to define a generally tubular shape in which the first layer is generally encircled by the second layer. The gas may pass from the gas source to a cavity generally encircled by the first layer. The first plurality of holes may be offset along an axis of the generally tubular shape from the second plurality of holes. The filter module may further have a third layer that cooperates with the first layer and the second layer to define the generally tubular shape. The second layer may be generally encircled by the third layer, and the third layer may have a third plurality of holes, each of which is not aligned with each hole of the second plurality of holes.

The exterior wall may have a plurality of apertures, one of which is the first aperture. The plurality of apertures may be offset along an axis of the generally tubular shape from the second plurality of holes and/or a third plurality of holes of a third layer that generally encircles the second layer. The first and second layers may be segments of a single metal sheet that is wrapped in a spiral configuration.

According to one method of manufacturing an inflator, such a method may include providing an exterior wall with a first aperture, providing a gas source, positioning the gas source within a chamber defined within the exterior wall such that, in response to receipt by the inflator of a first activation signal, the gas source provides a gas, and providing a filter module. Providing the filter module may include providing a metal sheet with a first segment with a first plurality of holes and a second segment adjacent to the first segment, with a second plurality of holes, and wrapping the metal sheet into a generally tubular shape such that the first segment defines a first layer that generally encircles a cavity into which the gas flows from the gas source and the second segment defines a second layer that generally encircles the first layer. In the generally tubular shape, each hole of the second plurality of holes may be displaced along an axis of the generally tubular shape from each hole of the first plurality of holes. The method may further include inserting the filter module into the exterior wall such that, during inflation, the gas flows through the filter module to reach the first aperture.

Providing the metal sheet may further include forming a first plurality of dimples on one of the first segment and the second segment such that, with the metal sheet in the generally tubular shape, the first plurality of dimples protrudes toward the other of the first segment and the second segment to maintain a gap between the first layer and the second layer. Forming the first plurality of dimples may include arranging the first plurality of dimples such that each dimple of the first plurality of dimples is substantially between and substantially equidistant from two adjacent holes of the corresponding plurality of holes.

Forming the first plurality of dimples may include forming the first plurality of dimples on the first segment such that, with the metal sheet in the generally tubular shape, the first plurality of dimples protrudes toward the second segment. Providing the metal sheet may further include forming a second plurality of dimples on the second segment such that, with the metal sheet in the generally tubular shape, the second plurality of dimples protrudes toward the exterior wall to maintain spacing between the second layer and one of the exterior wall, and a third layer of the filter module.

The metal sheet may further include a third segment adjacent to the second segment. The third segment may have a third plurality of holes. In the generally tubular shape, the third segment may define a third layer that substantially encircles the second layer. In the generally tubular shape, each hole of the third plurality of holes may be displaced along the axis of the generally tubular shape from each hole of the second plurality of holes.

The exterior wall may have a plurality of apertures, one of which is the first aperture. Inserting the filter module into the exterior wall may include offsetting the plurality of apertures along the axis of the generally tubular shape from the second plurality of holes and/or a third plurality of holes of a third layer that generally encircles the second layer.

According to one embodiment of the invention, an airbag assembly for protecting a vehicle occupant from injury may include an airbag and an inflator connected to the airbag to expel gas into the airbag to inflate the airbag. The inflator may include an exterior wall with a first aperture and a gas source contained within a chamber defined within the exterior wall. In response to receipt by the inflator of a first activation signal, the gas source may provide the gas. The inflator may further include a filter module with a first layer and a second layer wrapped around at least a portion of the first layer to define a generally tubular shape. The first layer may have a first plurality of holes and a first plurality of dimples that protrudes toward the second layer to maintain a gap between the first layer and the second layer. Each dimple of the first plurality of dimples may be separate from each hole of the corresponding plurality of holes. The second layer may have a second plurality of holes, each of which is not aligned with each hole of the first plurality of holes.

The dimples of the first plurality of dimples may be arranged such that each dimple of the first plurality of dimples is substantially between and substantially equidistant from two adjacent holes of the first plurality of holes. The second layer may further include a second plurality of dimples that protrude toward the exterior wall to maintain spacing between the second layer and the exterior wall and/or a third layer of the filter module. The first plurality of holes may be offset along an axis of the generally tubular shape from the second plurality of holes.

The exterior wall may have a plurality of apertures, one of which is the first aperture. The plurality of apertures may be offset along an axis of the generally tubular shape from the second plurality of holes and/or a third plurality of holes of a third layer that generally encircles the second layer.

These and other features and advantages of the present invention will become more fully apparent from the following description and appended claims, or may be learned by the practice of the invention as set forth hereinafter.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Exemplary embodiments of the present invention will be best understood by reference to the drawings, wherein like parts are designated by like numerals throughout. It will be readily understood that the components of the present invention, as generally described and illustrated in the Figures herein, could be arranged and designed in a wide variety of different configurations. Thus, the following more detailed description of exemplary embodiments of the apparatus, system, and method of the present invention, as represented in FIGS. 1 through 4, is not intended to limit the scope of the invention, as claimed, but is merely representative of exemplary embodiments of the invention.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together. The phrase "fluid communication" refers to two features that are connected such that a fluid that exits one feature is able to pass into or otherwise contact the other feature.

The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to the roof rail of the vehicle, in an overhead position, or at the knee or leg position. In the following disclosure, "airbag" may refer to any airbag type.

Figure 1:
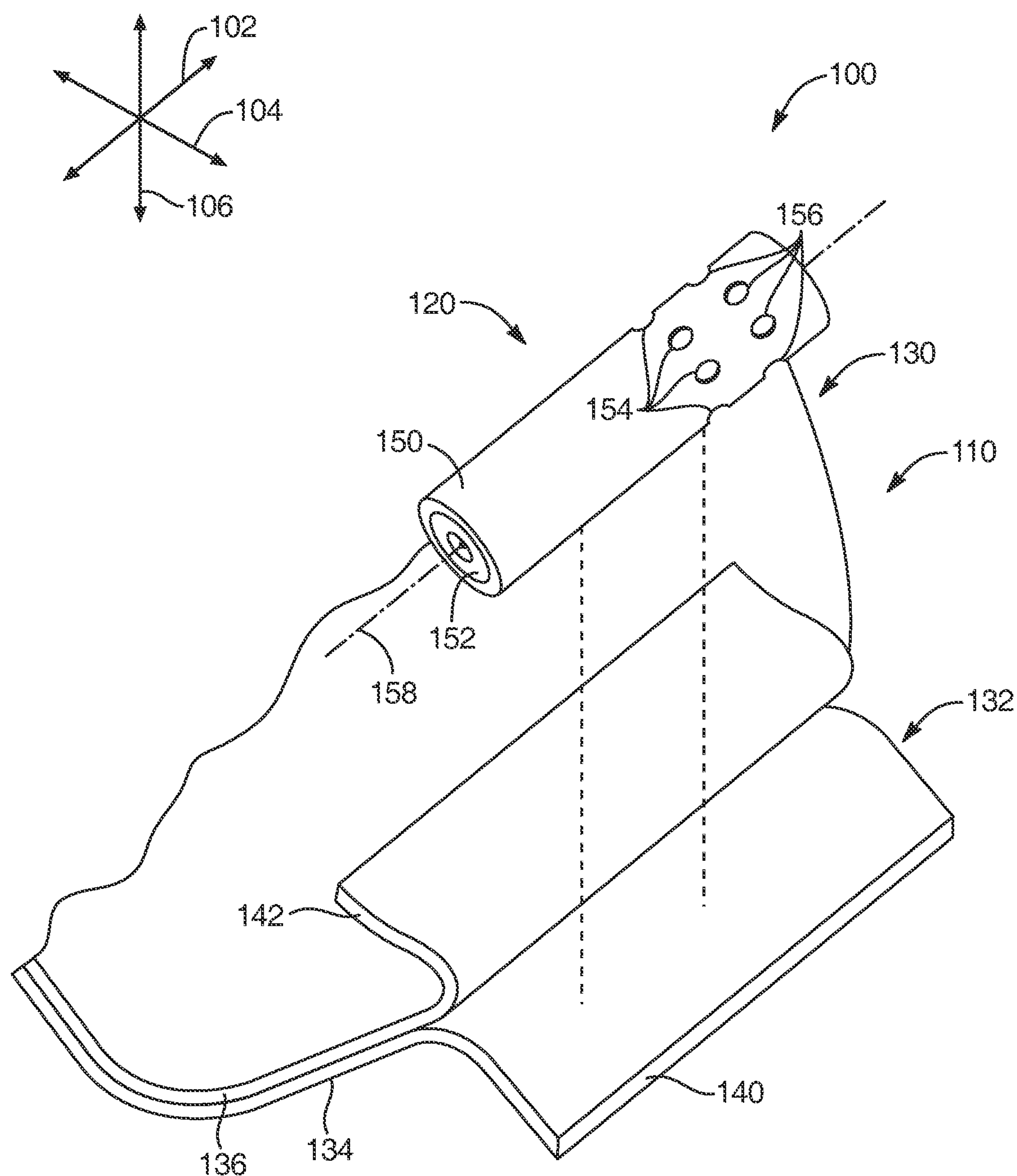
FIG. 1 is a perspective view of an airbag assembly according to one embodiment of the invention showing the inflator elevated from the airbag.

Referring to FIG. 1, a perspective view illustrates an airbag assembly 100 that may be used to protect the occupants of a vehicle during a collision. The airbag assembly 100 may be of any known type, including but not limited to driver's side airbags, passenger's side airbags, side airbags, inflatable curtain airbags, and knee airbags. The airbag assembly 100 may have a longitudinal direction 102, a lateral direction 104, and a transverse direction 106, all of which are orthogonal to each other.

The airbag assembly 100 may include an airbag 110 and an inflator 120. The airbag 110 may have a cushion 130 that inflates to receive and cushion impact from one or more vehicle occupants, and a mounting portion 132 securable to the vehicle. The airbag 110 may generally be formed from a first layer 134 and a second layer 136, both of which may be formed of a flexible material such as a woven fabric, a thin polymer sheet, or the like. The first layer 134 and the second layer 136 may be attached together via one-piece weaving, ultrasonic welding, RF welding, stitching, adhesive bonding, or a variety of other methods known in the art.

The first layer 134 and the second layer 136 may cooperate to define a first flap 140 and a second flap 142, which may be secured together to partially or fully enclose the inflator 120. Holes, fasteners, or other features (not shown) may be formed in and/or attached to the first flap 140 and/or the second flap 142 to facilitate attachment of the inflator 120 and/or the mounting portion 132 to the vehicle. Similarly, the inflator 120 may also have mounting features (not shown) that facilitate attachment of the inflator 120 and/or the mounting portion 132 to the vehicle.

The inflator 120 may have a generally cylindrical shape oriented generally along the longitudinal direction 102. The inflator 120 may have a length along the longitudinal direction 102 that is much greater than its width along the lateral direction 104 and the transverse direction 106. The inflator 120 may have an exterior wall 150 and an end cap 152. The exterior wall 150 may have a first set of apertures 154 and a second set of apertures 156 that release inflation gas into the interior of the cushion 130 in response to receipt of an activation signal indicative of a collision, impending collision, or other sudden acceleration or deceleration event.

The inflator 120 may have an axis 158 defined by the generally tubular shape of the exterior wall 150. The first set of apertures 154 may be centered on a first plane (not shown) perpendicular to the axis 158, and the second set of apertures 156 may be centered on a second plane (not shown) perpendicular to the axis 158 and offset from the first plane. Thus, the first set of apertures 154 may provide for radial egress of inflation gas from the inflator 120 into the cushion 130. The second set of apertures 156 may provide for radial egress of inflation gas from the inflator 120 into the cushion 130 at a location offset along the axis 158 from the location at which inflation gas exits the inflator 120 through the first set of apertures 154.

The configuration illustrated in FIG. 1 may be particularly suited to a side impact airbag that deploys from the seat or a part of the vehicle proximate the outboard surface of the seat. However, in use with the other airbag types set forth above, an inflator and airbag may be configured much differently from those shown in FIG. 1. For example, the inflator 120 may not be elongated, but may have a more disc-like shape in which the width is greater than the length. Apertures need not be located in the middle of an inflator as illustrated; rather apertures may be positioned at one or both ends of the inflator and/or at any location between them. Those of skill in the art will recognize that the inventive principles set forth herein may be used with a wide variety of inflator types.

Figure 2:
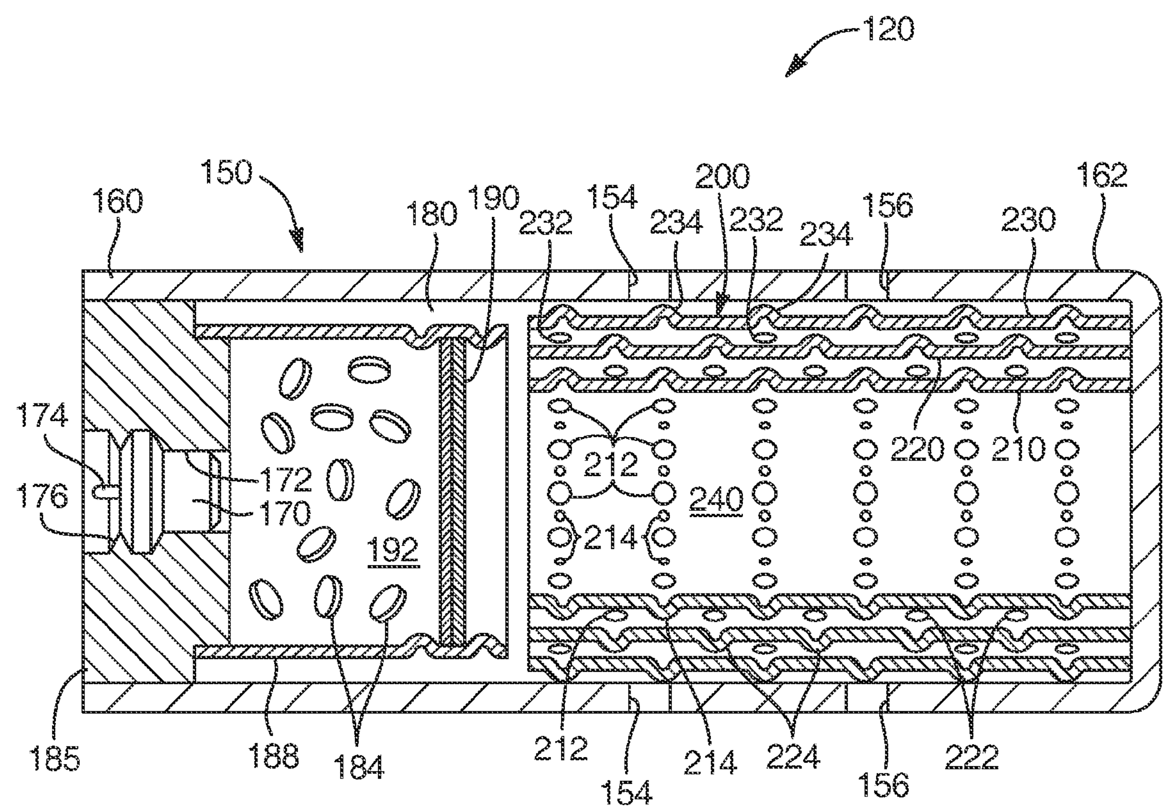
FIG. 2 is a side elevation, section view of the inflator of the airbag assembly of FIG. 1.
Figure 2:
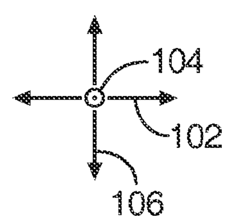

Referring to FIG. 2, a side elevation, section view illustrates the inflator 120 of the airbag assembly 100 of FIG. 1. The exterior wall 150 may have a first end 160 and a second end 162 displaced from the first end 160 along the longitudinal direction 102. As shown, the exterior wall 150 may be formed as a single piece, but in alternative embodiments, an exterior wall may be formed of multiple pieces joined together. The exterior wall 150 may be secured to the end cap 152 through a variety of ways including crimping, welding, brazing, chemical or adhesive bonding, fastening, thermal welding, inertial welding, or the like.

The end cap 152 may have an initiator 170 that ignites in response to receipt of an activation signal from the vehicle, which may, in turn, be generated by a signal-generating element (not shown) such as a control system, sensor assembly, or other apparatus within the vehicle. The initiator 170 may be located within a cavity 172 defined within the interior of the first end cap 152 as shown, or may alternatively protrude into the interior of the inflator 120. The initiator 170 may be electrically connected to the activation signal-generating element within the vehicle via a pin 174 that resides within a socket 176 defined within the exposed end of the end cap 152 to receive a connector such as a plug (not shown) connected to the signal-generating element. The inflator 120 may be a single stage inflator, and may thus fully activate in response to receipt of only a single activation signal.

A chamber 180 may be defined within the exterior wall 150. The chamber 180 may contain a first gas source. The present invention encompasses all different gas sources; accordingly, gas sources including pyrotechnic generants, compressed-stored gas, any other known gas source, or any combination thereof may be used.

The inflator 120 may take the form of a pyrotechnic inflator that utilizes both pyrotechnic generants and compressed gases. Thus, the chamber 180 may contain a generant 184. Generally, a "generant" is a substance that produces gas through some type of reaction including combustion or other chemical reactions. A generant may be a solid, a liquid, or any combination thereof. As shown in FIG. 2, the generant 184 may take the form of pellets that predictably combust to produce inflation gas. The generant 184 may be contained in close proximity to the initiator 170 by a circumferential wall 188 and an end wall 190 that cooperate to define a generant chamber 192 that contains the generant 184. The circumferential wall 188 may be crimped on either side of the end wall 190 to keep the end wall 190 in place without the need for fasteners or adhesives. The end wall 190 may be designed to rupture as the generant 184 commences producing gas. In alternative embodiments (not shown), the circumferential wall 188 and the end wall 190 may be combined into a single component or omitted altogether, and the generant 184 may reside in the chamber 180 without being contained within any other enclosure.

A filter module 200 may be positioned to filter the gases produced by the generant 184 before the gases exit the inflator 120. The filter module 200 may have a first layer 210 with a plurality of holes 212 and a plurality of dimples 214, a second layer 220 with a plurality of holes 222 and a plurality of dimples 224, and a third layer 230 with a plurality of holes 232 and a plurality of dimples 234. The filter module 200 may have a generally tubular shape, which may be provided by wrapping a thin, pliable object, such as a metal plate, around a mandrel or the like, as will be described in greater detail subsequently. The generally tubular shape of the filter module 200 may define a generally cylindrical internal cavity 240 into which gas flows after departing the generant chamber 192.

In this application, a "dimple" refers to any protruding feature. A dimple need not have any particular shape; thus, a dimple may have any of a wide variety of shapes including cylindrical, hemispherical, rectangular, prismatic, other shapes, and/or combinations thereof.

The holes 212 of the first layer 210 may enable passage of the gas through the first layer 210. The dimples 214 of the first layer 210 may protrude toward the second layer 220 so that the dimples 214 help to maintain the appropriate spacing (i.e., a gap) between the first layer 210 and the second layer 220 to ensure that the gas is able to move relatively freely between the first layer 210 and the second layer 220.

The holes 212 and the dimples 214 may be grouped in a plurality of generally circular formations (for example, six circular formations as shown in FIG. 2) that are displaced from each other along the axis 158 of the exterior wall 150, which may also be the axis of the generally tubular shape of the filter module 200. The holes 212 and the dimples 214 of each generally circular formation may be arranged in an alternating pattern (i.e., hole, dimple, hole, and dimple) around the circumference of the first layer 210.

In alternative embodiments (not shown), a first layer may have an entirely different arrangement of holes and dimples, such as multiple holes between each dimple, multiple dimples between each hole, holes and dimples in different generally circular formations, positioning of holes and dimples out of alignment with their counterparts in other generally circular formations, and/or placement of holes and/or dimples in arrangements other than generally circular formations. Many other arrangements of holes and/or dimples would be envisioned by a person of skill in the art with the aid of the present disclosure.

The holes 212 and the dimples 214 may advantageously be separate from each other. Thus, each of the dimples 214 may be entirely unbroken so that no gas flows through each of the dimples 214, and each of the holes 212 may be formed in the region of the first layer 210 that exists between the dimples 214. This may provide a tortuous gas flow pathway that helps to slow, cool and/or purify the flow of gas while avoiding narrow flow restrictions that may become blocked or otherwise cause unpredictable and/or excessive delays in the egress of gas from the inflator 120.

If desired, the edge of each hole 212 may be coincident with the edge of the closest dimple 214. Alternatively, the edge of each hole 212 may be separated from the edge of the closest dimple by an offset, for example, ranging from 0.5 mm to 5 mm. Alternatively, the offset may range from 1 mm to 3 mm. Alternatively, the offset may be about 2 mm.

The holes 222 of the second layer 220 may enable passage of the gas through the second layer 220. The dimples 224 of the second layer 220 may protrude toward the third layer 230 so that the dimples 224 help to maintain the appropriate spacing between the second layer 220 and the third layer 230 to ensure that the gas is able to move relatively freely between the second layer 220 and the third layer 230.

Like the holes 212 and the dimples 214 of the first layer 210, the holes 222 and the dimples 224 of the second layer 220 may be arranged in a plurality of generally circular formations (for example, five generally circular formations as shown in FIG. 2). The holes 222 of the second layer 220 may be axially offset from the holes 212 of the first layer 210 so that inflation gas moving through the filter module 200 must, after existing one of the holes 212 of the first layer 210, travel for some distance along the axis 158 before passing through one of the holes 222 of the second layer 220.

Additionally, like the holes 212 and the dimples 214 of the first layer 210, the holes 222 and the dimples 224 of the second layer 220 may be separate from each other to help provide a tortuous, and yet relatively unrestricted, gas flow pathway between the second layer 220 and the third layer 230. The holes 222 and the dimples 224 may also be offset from each other as indicated previously with respect to the holes 212 and the dimples 214 of the first layer 210.

Similarly, the holes 232 of the third layer 230 may enable passage of the gas through the third layer 230. The dimples 234 of the third layer 230 may protrude toward the exterior wall 150 so that the dimples 234 help to maintain the appropriate spacing between the third layer 230 and the exterior wall 150 to ensure that the gas is able to move relatively freely between the third layer 230 and the exterior wall 150.

Like the holes 212 and the dimples 214 of the first layer 210, and the holes 222 and the dimples 224 of the second layer 220, the holes 232 and the dimples 234 of the third layer 230 may be arranged in a plurality of generally circular formations (for example, four generally circular formations as shown in FIG. 2, with two generally circular formations having only dimples 234, as will be discussed subsequently). The holes 232 of the third layer 230 may be axially offset from the holes 222 of the second layer 220 so that inflation gas moving through the filter module 200 must, after existing one of the holes 222 of the second layer 220, travel for some distance along the axis 158 before passing through one of the holes 232 of the third layer 230.

Additionally, like the holes 212 and the dimples 214 of the first layer 210 and the holes 222 and the dimples 224 of the second layer 220, the holes 232 and the dimples 234 of the third layer 230 may be separate from each other to help provide a tortuous, and yet relatively unrestricted, gas flow pathway between the third layer 230 and the exterior wall 150. The holes 232 and the dimples 234 may also be offset from each other as indicated previously with respect to the holes 212 and the dimples 214 of the first layer 210.

In operation, an activation signal may be produced by the associated signal-generating element in response to detection of a collision, impending collision, or other event that requires deployment of the airbag assembly 100. The activation signal may be conveyed to the socket 176 and to the initiator 170 through the pin 174. The initiator 170 may then ignite to cause ignition of the generant 184 within the generant chamber 192. The generant 184 may produce gas that ruptures the circumferential wall 188 and/or the end wall 190. The expanding gas may flow into the generally cylindrical internal cavity 240.

During passage of the gases through the filter module 200, particulates, debris, and any other impurities within the gas may be trapped, and the gas may be cooled and/or slowed. Thus, the gas may exit the inflator 120 at the desired temperature, velocity, and/or level of purity to effectively inflate the airbag 110 without damaging it. The manner in which filtration is accomplished via a tortuous gas flow pathway will be shown and described in greater detail in connection with FIG. 3.

Figure 3:
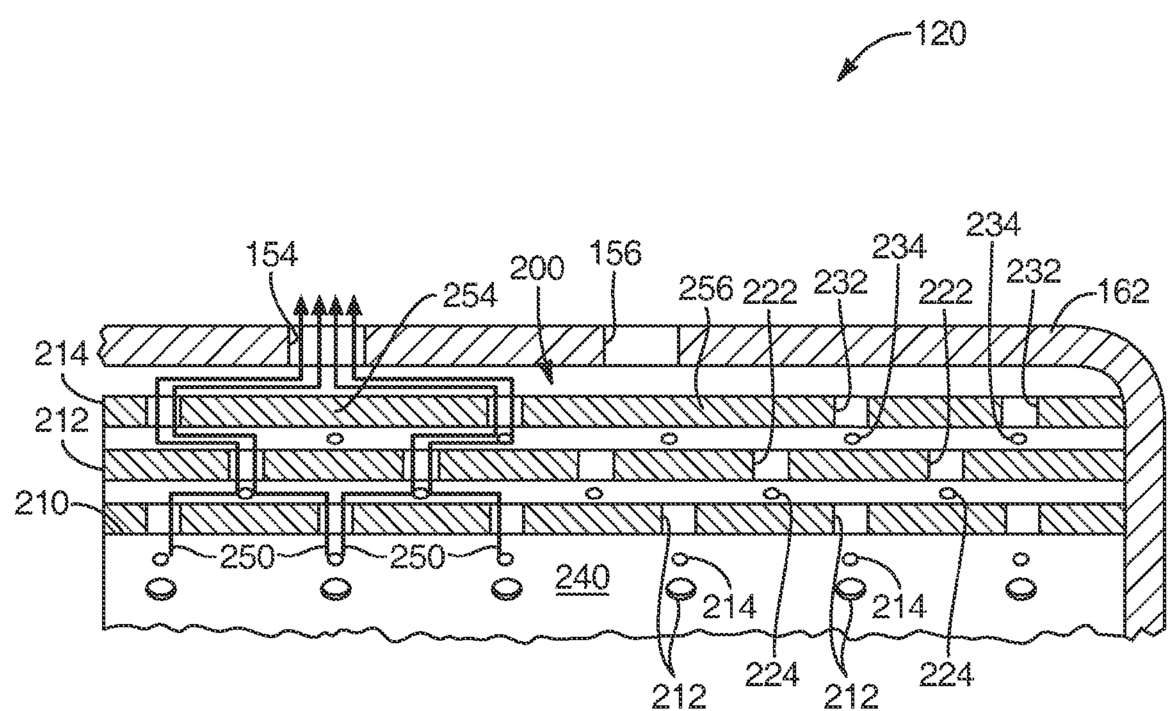
FIG. 3 is a cut-away side elevation, section view of a portion of the inflator of FIG. 1, with the holes of the various layers of the filter module aligned in a common plane through the axis of the inflator to illustrate gas flow through the filter module.

Referring to FIG. 3, a side elevation, section view illustrates a portion of the inflator 120 of FIG. 1, with the holes of the various layers of the filter module 200 aligned in a common plane through the axis 158 of the inflator 120 to illustrate gas flow through the filter module 200. More precisely, the holes 212 of the first layer 210, the holes 222 of the second layer 220, and the holes 232 of the third layer 230 are illustrated with their centers in a common plane (i.e., the section plane of FIG. 3) through which the axis 158 passes. This is done to facilitate illustration of the tortuous flow path through which gas may pass through the filter module 200. However, in actual practice, the centers of the holes 212, the holes 222, and the holes 232 may not be coplanar because they may be positioned at different angles about the axis 158. Similarly, in FIG. 2, the centers of the dimples 214, the dimples 224, and the dimples 234 are all in the section plane of FIG. 2, but in actual practice, they may be displaced from each other at various angles about the axis 158.

By way of example, FIG. 3 illustrates exemplary gas flows 250 indicating pathways the gas may take to move from the cylindrical internal cavity 240 to the exterior of the inflator 120. As shown, the gas may first flow radially outward and impinge against the interior surface of the first layer 210; this impingement may slow the flow of inflation gas and cool the inflation gas by transferring some heat from the inflation gas to the first layer 210 and/or other parts that are connected to it in a manner that facilitates thermal conduction. Furthermore, impurities such as uncombusted generant, slag, particulate impurities, and the like, may fall out of entrainment and/or adhere to the interior surface of the first layer 210, thereby purifying the gas flows 250.

The inflation gas may travel axially (i.e., parallel to the axis 158) and/or circumferentially (i.e., along an arcuate pathway centered on the axis 158) along the interior surface of the first layer 210 until it reaches one of the holes 212 of the first layer 210. The gas may then move through the hole 212 and, again, flow radially outward. The gas may then impinge against the interior surface of the second layer 220. As with impingement against the interior surface of the first layer 210, this impingement against the interior surface of the second layer 220 may serve to slow, cool, and/or purify the inflation gas. Heat from the inflation gas may be transferred into the second layer 220.

The inflation gas may then travel axially and/or circumferentially along the interior surface of the second layer 220 until it reaches one of the holes 222 of the second layer 220. The gas may then move through the hole 222 and, again, flow radially outward. The gas may then impinge against the interior surface of the third layer 230. As with impingement against the interior surfaces of the first layer 210 and the second layer 220, this impingement against the interior surface of the third layer 230 may serve to slow, cool, and/or purify the inflation gas. Heat from the inflation gas may be transferred into the third layer 230.

The inflation gas may then travel axially and/or circumferentially along the interior surface of the third layer 230 until it reaches one of the holes 232 of the third layer 230. The gas may then move through the hole 232 and, again, flow radially outward. The gas may then impinge against the interior surface of the exterior wall 150. As with impingement against the interior surfaces of the first layer 210, the second layer 220, and the third layer 230, this impingement against the interior surface of the exterior wall 150 may serve to slow, cool, and/or purify the inflation gas. Heat from the inflation gas may be transferred into the exterior wall 150 and/or other parts that are connected to it in a manner that facilitates thermal conduction.

As shown, the holes 232 of the third layer 230 may generally be in alignment with the holes 212 of the first layer 210, but out of alignment with the holes 222 of the second layer 220. However, while the first layer 210 may have holes 212 in axial alignment with the first set of apertures 154 and the second set of apertures 156, the third layer 230 may have no such holes. Rather, a first barrier zone 254 may be aligned with the first set of apertures 154, and a second barrier zone 256 may be aligned with the second set of aperture 156. There may be dimples 234, but no holes 232, in each of the first barrier zone 254 and the second barrier zone 256. Thus, the first barrier zone 254 and the second barrier zone 256 may force the inflation gas to flow axially to reach a hole 232 that is not aligned with any of the apertures 154 and the apertures 156. This may ensure that the inflation gas is not able to exit the inflator 120 from any of the holes 232 of the third layer 230 without first impinging against the interior surface of the exterior wall 150 and receiving the heat transfer, purification, and/or slowing described above in connection with impingement against the interior surfaces of the first layer 210, the second layer 220, and the third layer 230.

In this application, “aligned” holes may generally refer to holes that are generally parallel to each other and have substantial overlap with each other when viewed from a direction perpendicular to them. Thus, if circular holes are aligned, they may be coaxial or nearly coaxial. Holes that are “axially aligned” are holes positioned at the same location along an axis, such as the axis 158. Axially aligned holes may be circumferentially offset from each other, i.e., one of the holes may have a position that is rotated about the axis relative to the position of the other hole. “Circumferentially aligned” holes are holes that have positions at the same or nearly the same angle of rotation about an axis such as the axis 158. Circumferentially aligned holes may be axially offset from each other. Hence, holes that are just “axially aligned” or “circumferentially aligned” may only be uni-directionally aligned, and therefore may not be “aligned,” e.g., bi-directionally aligned.

After moving through the holes 232 of the third layer 230, the inflation gas may then travel axially and/or circumferentially along the interior surface of the exterior wall 150 until it reaches one of the apertures 154 or the apertures 156. The gas may then move through the aperture 154 and/or the aperture 156 and flow radially outward to exit the inflator 120. Although the exemplary gas flows 250 illustrated in FIG. 3 move only through the aperture 154 shown in FIG. 3, other gas flows closer to the second end 162 may instead move through the aperture 156 shown in FIG. 3, and the holes 212, holes 222, and holes 232 closer to it.

As mentioned previously, the centers of the holes 212, the holes 222, and the holes 232 may not, in actuality, be circumferentially aligned with each other (i.e., they need not be coplanar as illustrated in FIG. 3). With the centers of the holes 212, the holes 222, and the holes 232 rotated to different angles about the axis 158, the manner in which inflation gas flows through the filter module 200 may still be as shown in FIG. 3, except that between the first layer 210 and the second layer 220, between the second layer 220 and the third layer 230, and between the third layer 230 and the exterior wall 150, the gas may need to flow some distance circumferentially (i.e., into or out of the page relative to the view of FIG. 3) in order to reach the next hole 222, hole 232, aperture 154, or aperture 156.

The fact that the holes 212, the holes 222, and the holes 232 need not be circumferentially aligned with each other may be a significant benefit of the invention. The lack of a requirement of circumferential alignment may facilitate the process of manufacturing the filter module 200, particularly if the filter module 200 is formed by wrapping a single metal sheet or the like. More specifically, the lack of a need for circumferential alignment may be beneficial because care need not be taken to make sure that each of the first layer 210, the second layer 220, and the third layer 230 is wrapped with the proper tightness. Similarly, the dimples 214, dimples 224, and the dimples 234 need not maintain any circumferential alignment, thus contributing to the benefit provided by the lack of such a requirement of for the holes 212, the holes 222, and the holes 232. One exemplary manner in which the filter module 200 may be manufactured will be shown and described in connection with FIG. 4.

Figure 4:
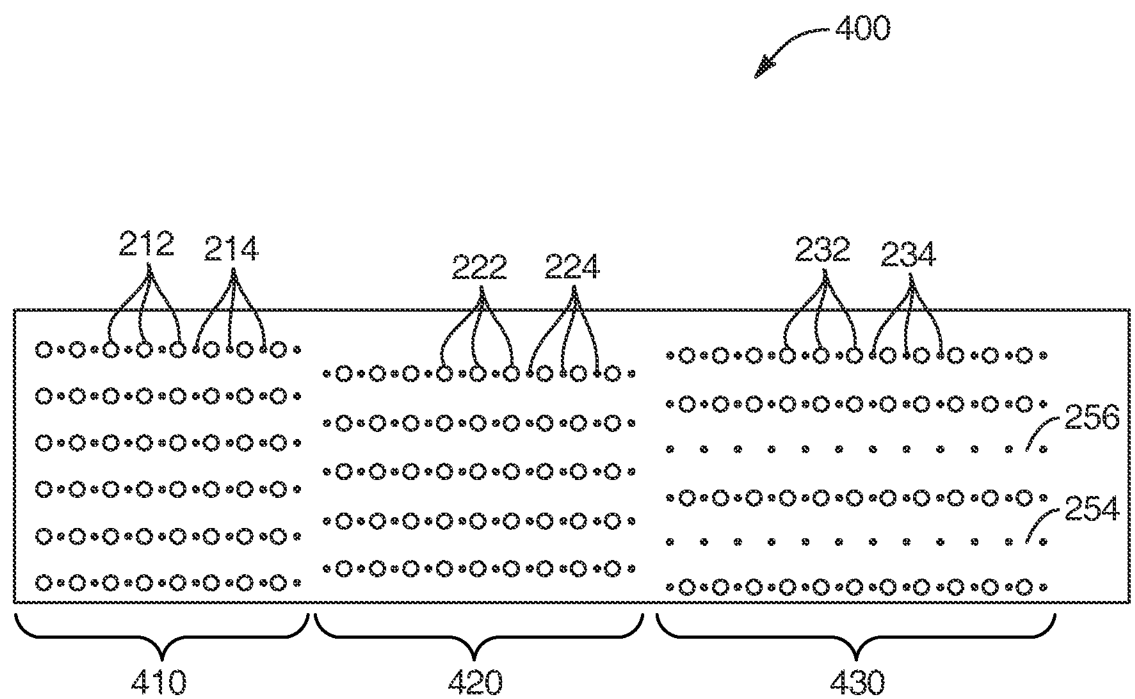
FIG. 4 is a plan view of the filter module of the inflator of FIG. 1 before it has been wrapped into the generally tubular shape shown in FIG. 2.

Referring to FIG. 4, a plan view illustrates an exemplary filter module 200 of the inflator 120 of FIG. 1 before it has been wrapped into the generally tubular shape shown in FIG. 2. The inflator 120 may be formed from a single piece of material. If desired, the inflator 120 may be wrapped into the generally tubular shape shown in FIG. 2 and FIG. 3. In order to facilitate this, the inflator 120 may be formed of a material that is sturdy enough to maintain integrity during inflation, yet ductile and/or malleable enough to be relatively easily formable.

Returning to FIG. 4, the inflator 120 may be formed of a metal sheet 400, which may be made of steel, stainless steel, aluminum, an alloy thereof, or the like. The metal sheet 400 may be rolled around a mandrel or other generally cylindrical object to provide the desired generally tubular shape. The metal sheet 400 may be wrapped in a spiral configuration, which may provide the generally tubular shape. If desired, the metal sheet 400 may be heated, chemically treated, or otherwise processed prior to wrapping to enhance the ductility of the metal sheet 400. The wrapping process may be formed manually with a tool such as a metal bender, or may be automated through the use of the corresponding machinery.

The metal sheet 400 may have a generally rectangular shape as shown, and may be divided into a first segment 410, a second segment 420 adjacent to the first segment 410, and a third segment 430 adjacent to the second segment 420. Once the metal sheet 400 has been wrapped into the generally tubular shape, the first segment 410 may form the first layer 210, the second segment 420 may form the second layer 220, and the third segment 430 may form the third layer 230.

The holes 212 and the dimples 214 may be formed on the first segment 410 to be present on the first layer 210. The holes 212 and the dimples 214 may be formed in a series of straight lines, and may be arranged in alternating fashion as mentioned above (i.e., hole, dimple, hole, and dimple). The holes 212 and the dimples 214 of the first segment 410 may be arranged in six straight lines as shown. Similarly, the holes 222 and the dimples 224 of the second segment 420 may be arranged in five straight lines in alternating fashion, and the holes 232 and the dimples 234 of the third segment 430 may be arranged in four straight lines, with the dimples 234 of the first barrier zone 254 and the second barrier zone 256 being similarly arranged in two additional straight lines.

The holes 232 and the dimples 234 of the third segment 430 may be arranged in straight lines that are collinear with those of the holes 212 and the dimples 214 of the first segment 410. The holes 222 and the dimples 224 of the second segment 420 may be parallel to, but offset from (i.e., non-collinear with) the holes 212 and the dimples 214 of the first segment 410 and the holes 232 and the dimples 234 of the third segment 430.

Consequently, after the filter module 200 has been wrapped into the generally tubular shape, the holes 232 and the dimples 234 of the third layer 230 may be generally aligned with the holes 212 and the dimples 214 of the first layer 210. The holes 222 and the dimples 224 of the second segment 420 may be out of alignment with the holes 212 and the dimples 214 of the first layer 210 and the holes 232 and the dimples 234 of the third layer 230, as shown in FIGS. 2 and 3. The first barrier zone 254 and the second barrier zone 256 may positioned on the third segment 430 such that, upon insertion of the filter module 200 into the exterior wall 150, the first barrier zone 254 is aligned with the first set of apertures 154 and the second barrier zone 256 is aligned with the second set of apertures 156, as shown in FIGS. 2 and 3.

In alternative embodiments (not shown), an inflator according to the invention may be formed of separate, nesting tubular shapes. In other alternative embodiments, an inflator according to the invention need not have a tubular shape, but may instead be relatively planar. Such an inflator may be formed by, for example, folding a single material sheet over itself to provide the layers, or stacking multiple separate material layers.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, Figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112 Para. 6. It will be apparent to those having skill in the art that changes may be made to the details of the above-described embodiments without departing from the underlying principles of the invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. An inflator for an airbag assembly for protecting a vehicle occupant from injury, the inflator comprising:

an exterior wall comprising a first aperture;

a gas source contained within a chamber defined within the exterior wall, wherein, in response to receipt by the inflator of a first activation signal, the gas source provides a gas; and a filter module made from a sheet wrapped in a spiral configuration comprising a first layer and a second layer, wherein:

the first layer is a first segment of the sheet and comprises a first plurality of holes, wherein the first layer is positioned such that the gas passes through the first plurality of holes to reach the second layer;

the second layer is a second segment of the sheet and comprises a second plurality of holes, each hole of the second plurality of holes is not aligned radially with each hole of the first plurality of holes, wherein the second layer is positioned such that the gas passes through the second plurality of holes to reach the first aperture; and one of the first layer and the second layer comprises a first plurality of dimples, wherein each dimple of the first plurality of dimples protrudes toward the other of the first layer and the second layer to maintain an open spacing between the first layer and the second layer for the gas to flow along a tortuous pathway through the open spacing from the first plurality of holes to the second plurality of holes, wherein each dimple of the plurality of dimples is separate from each hole of the corresponding plurality of holes.

2. The inflator of claim 1, wherein the dimples of the first plurality of dimples are arranged such that each dimple of the first plurality of dimples is substantially between and substantially equidistant from two adjacent holes of the corresponding first plurality of holes.

3. The inflator of claim 1, wherein the first layer comprises the first plurality of dimples, wherein the first plurality of dimples protrude toward the second layer, wherein the second layer further comprises a second plurality of dimples that protrude toward the exterior wall to maintain spacing between the second layer and one selection from the group consisting of the exterior wall, and a third layer of the filter module.

4. The inflator of claim 3, wherein each dimple of the first plurality of dimples is offset from each adjacent hole of the first plurality of holes by an offset of at least 0.5 mm.

5. The inflator of claim 1, wherein the first layer and the second layer cooperate to define a generally tubular shape in which the first layer is generally encircled by the second layer, wherein the gas passes from the gas source to a cavity generally encircled by the first layer.

6. The inflator of claim 5, wherein the first plurality of holes is offset along an axis of the generally tubular shape from the second plurality of holes.

7. The inflator of claim 5, wherein the filter module further comprises a third layer that cooperates with the first layer and the second layer to define the generally tubular shape, wherein the second layer is generally encircled by the third layer, the third layer comprising a third plurality of holes, each of which is not aligned with each hole of the second plurality of holes.

8. The inflator of claim 5, wherein the exterior wall comprises a plurality of apertures, one of which is the first aperture, wherein the plurality of apertures is offset along an axis of the generally tubular shape from at least one selection from the group consisting of the second plurality of holes, and a third plurality of holes of a third layer that generally encircles the second layer.

9. The inflator of claim 5, wherein the first and second layers are segments of a single metal sheet that is wrapped in a spiral configuration.

10. A method of manufacturing an inflator, the method comprising:

providing an exterior wall comprising a first aperture;

providing a gas source;

positioning the gas source within a chamber defined within the exterior wall such that, in response to receipt by the inflator of a first activation signal, the gas source provides a gas;

providing a filter module by:

providing a metal sheet comprising a first segment and a second segment adjacent to the first segment, wherein the first segment comprises a first plurality of holes and the second segment comprises a second plurality of holes;

forming a first plurality of dimples on one of the first segment and the second segment; and wrapping the metal sheet into a generally tubular shape such that the first segment defines a first layer that generally encircles a cavity into which the gas flows from the gas source and the second segment defines a second layer that generally encircles the first layer, with the metal sheet in the generally tubular shape, the first plurality of dimples protrudes toward the other of the first segment and the second segment to maintain an open spacing between the first layer and the second layer;

wherein, in the generally tubular shape, each hole of the second plurality of holes is displaced along an axis of the generally tubular shape from each hole of the first plurality of holes; and inserting the filter module into the exterior wall such that, during inflation, the gas flows along a tortuous pathway through the filter module to reach the first aperture.

11. The method of claim 10, wherein forming the first plurality of dimples comprises arranging the first plurality of dimples such that each dimple of the first plurality of dimples is substantially between and substantially equidistant from two adjacent holes of the corresponding plurality of holes.

12. The method of claim 10, wherein forming the first plurality of dimples comprises forming the first plurality of dimples on the first segment such that, with the metal sheet in the generally tubular shape, the first plurality of dimples protrudes toward the second segment, wherein providing the metal sheet further comprises forming a second plurality of dimples on the second segment such that, with the metal sheet in the generally tubular shape, the second plurality of dimples protrudes toward the exterior wall to maintain spacing between the second layer and one selection from the group consisting of the exterior wall, and a third layer of the filter module.

13. The method of claim 10, wherein the metal sheet further comprises a third segment adjacent to the second segment, wherein the third segment comprises a third plurality of holes, wherein, in the generally tubular shape, the third segment defines a third layer that substantially encircles the second layer, wherein, in the generally tubular shape, each hole of the third plurality of holes is displaced along the axis of the generally tubular shape from each hole of the second plurality of holes.

14. The method of claim 10, wherein the exterior wall comprises a plurality of apertures, one of which is the first aperture, wherein inserting the filter module into the exterior wall comprises offsetting the plurality of apertures along the axis of the generally tubular shape from at least one selection from the group consisting of the second plurality of holes, and a third plurality of holes of a third layer that generally encircles the second layer.

15. An airbag assembly for protecting a vehicle occupant from injury, the airbag assembly comprising:

an airbag; and an inflator connected to the airbag to expel gas into the airbag to inflate the airbag, the inflator comprising:

an exterior wall comprising a first aperture;

a gas source contained within a chamber defined within the exterior wall, wherein, in response to receipt by the inflator of a first activation signal, the gas source provides the gas; and a filter module made from a sheet wrapped in a spiral configuration comprising a first layer and a second layer, at least a portion of the second layer being wrapped around at least a portion of the first layer to define a generally tubular shape; wherein:

the first layer comprises a first plurality of holes and a first plurality of dimples that protrudes toward the second layer to maintain an open spacing between the first layer and the second layer for the gas to flow along a tortuous pathway through the open spacing, wherein each dimple of the first plurality of dimples is spaced from each hole of the first plurality of holes; and the second layer comprises a second plurality of holes, each hole of the second plurality of holes which is not aligned radially with each hole of the first plurality of holes.

16. The airbag assembly of claim 15, wherein the dimples of the first plurality of dimples are arranged such that each dimple of the first plurality of dimples is substantially between and substantially equidistant from two adjacent holes of the first plurality of holes.

17. The airbag assembly of claim 15, wherein the second layer further comprises a second plurality of dimples that protrude toward the exterior wall to maintain spacing between the second layer and one of the exterior wall and a third layer of the filter module.

18. The airbag assembly of claim 15, wherein the first plurality of holes is offset along an axis of the generally tubular shape from the second plurality of holes.

19. The airbag assembly of claim 15, wherein the exterior wall comprises a plurality of apertures, one of which is the first aperture, wherein the plurality of apertures is offset along an axis of the generally tubular shape from at least one selection from the group consisting of the second plurality of holes, and a third plurality of holes of a third layer that generally encircles the second layer.

* * * * *